United States Patent [19]
Claydon

[11] Patent Number: 5,625,571
[45] Date of Patent: Apr. 29, 1997

[54] PREDICTION FILTER

[75] Inventor: Anthony P. J. Claydon, Bath, United Kingdom

[73] Assignee: Discovision Associates, Irvine, Calif.

[21] Appl. No.: 399,810

[22] Filed: Mar. 7, 1995

[30] Foreign Application Priority Data

Mar. 24, 1994 [GB] United Kingdom ............... 9405914

[51] Int. Cl.$^6$ ........................................ H04N 9/79
[52] U.S. Cl. ................... 364/514 A; 364/715.02; 348/403
[58] Field of Search ................ 364/514 R, 715.02, 364/514 A; 345/202; 348/403, 409, 411, 412; 382/56; 370/43, 58.2, 60.1; 395/114; 377/55

[56] References Cited

U.S. PATENT DOCUMENTS

| | | | |
|---|---|---|---|
| 3,893,042 | 7/1975 | Whitman et al. | 331/55 |
| 3,962,685 | 6/1976 | Isle | 340/172.5 |
| 4,107,780 | 8/1978 | Grimsdale et al. | 364/521 |

(List continued on next page.)

FOREIGN PATENT DOCUMENTS

| | | |
|---|---|---|
| 0196911 | 10/1986 | European Pat. Off. . |
| 0255767 | 2/1988 | European Pat. Off. . |
| 0468480 | 1/1992 | European Pat. Off. . |
| 0572262 | 12/1993 | European Pat. Off. . |
| 0572263 | 12/1993 | European Pat. Off. . |
| 0576749 | 1/1994 | European Pat. Off. . |
| 0589734 | 3/1994 | European Pat. Off. . |
| 0639032 | 2/1995 | European Pat. Off. . |
| 2045035 | 10/1980 | United Kingdom . |
| 2059724 | 4/1981 | United Kingdom . |
| 2171578 | 8/1986 | United Kingdom . |
| 2194085 | 2/1988 | United Kingdom . |
| 2268035 | 12/1993 | United Kingdom . |
| 2269070 | 1/1994 | United Kingdom . |

OTHER PUBLICATIONS

Chong, "A Data Flow Architecture For Digital Image Processing," Wescon Tech. Papers No. 4/6, Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, 5 Jun. 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori et al., "An Elastic Pipeline Mechanism By Self-Timed Circuits," IEEE Journal Of Solid-State Circuits, vol. 23, No. 1, Feb. 1988, New York, NY, USA, pp. 111–117.

(List continued on next page.)

*Primary Examiner*—Emanuel T. Voeltz
*Assistant Examiner*—Thomas Peeso
*Attorney, Agent, or Firm*—Ronald J. Clark; Robert T. Braun; Arthur S. Bickel

[57] ABSTRACT

An apparatus is disclosed for processing video information using a first and a second prediction filter circuit which are substantially identical, and a control signal to process video information encoded in multiple standards. A filter circuit, such as may be used in such an apparatus, for use in video decompression comprises a prediction filter formatter, a first one-dimensional prediction filter, a dimension buffer, and a second one-dimensional prediction filter. A prediction filter, such as may be used in such a filter circuit, may comprise six registers, two multiplexers, and two summing circuits. A first register is connected to a first summing circuit. A second register is connected to a first multiplexer, which is connected to the first summing circuit. The first summing circuit is connected to a third register. A fourth register is connected to a second multiplexer, which is connected to a fifth register. The third register and the fifth register are connected to a second summing circuit, which is connected to a sixth register.

12 Claims, 4 Drawing Sheets

U.S. PATENT DOCUMENTS

| | | | |
|---|---|---|---|
| 4,142,205 | 2/1979 | Iinuma | 358/13 |
| 4,149,242 | 4/1979 | Pirz | 364/200 |
| 4,196,448 | 4/1980 | Whitehouse et al. | 358/135 |
| 4,215,369 | 7/1980 | Iijima | 358/146 |
| 4,302,775 | 11/1981 | Widergren et al. | 358/136 |
| 4,334,246 | 6/1982 | Saran | 358/261 |
| 4,433,308 | 2/1984 | Hirata | 331/17 |
| 4,437,072 | 3/1984 | Asami | 331/1 A |
| 4,495,629 | 1/1985 | Zasio et al. | 377/70 |
| 4,540,903 | 9/1985 | Cooke et al. | 307/465 |
| 4,580,066 | 4/1986 | Berndt | 307/276 |
| 4,630,198 | 12/1986 | Yuan | 364/200 |
| 4,646,151 | 2/1987 | Welles, II et al. | 358/149 |
| 4,679,163 | 7/1987 | Arnould et al. | 364/725 |
| 4,747,070 | 5/1988 | Trottier et al. | 364/900 |
| 4,785,349 | 11/1988 | Keith et al. | 358/136 |
| 4,789,927 | 12/1988 | Hannah | 364/200 |
| 4,799,677 | 1/1989 | Frederiksen | 273/1 E |
| 4,823,201 | 4/1989 | Simon et al. | 358/133 |
| 4,829,465 | 5/1989 | Knauer et al. | 364/725 |
| 4,831,440 | 5/1989 | Borgers et al. | 358/133 |
| 4,866,510 | 9/1989 | Goodfellow et al. | 358/13 |
| 4,866,637 | 9/1989 | Gonzalez-Lopez et al. | 364/518 |
| 4,887,224 | 12/1989 | Okano et al. | 364/518 |
| 4,891,784 | 1/1990 | Kato et al. | 364/900 |
| 4,903,018 | 2/1990 | Wiebach et al. | 341/51 |
| 4,912,668 | 3/1990 | Aubie et al. | 364/725 |
| 4,922,341 | 5/1990 | Strobach | 358/136 |
| 4,924,298 | 5/1990 | Kitamura | 358/12 |
| 4,924,308 | 5/1990 | Feuchtwanger | 358/133 |
| 4,975,595 | 12/1990 | Roberts et al. | 307/272.2 |
| 4,991,112 | 2/1991 | Callemyn | 364/518 |
| 5,003,204 | 3/1991 | Cushing et al. | 307/465 |
| 5,027,212 | 6/1991 | Marlton et al. | 358/183 |
| 5,038,209 | 8/1991 | Hang | 358/136 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,091,721 | 2/1992 | Hamori | 340/727 |
| 5,107,345 | 4/1992 | Lee | 358/432 |
| 5,111,292 | 5/1992 | Kuriacose et al. | 358/133 |
| 5,113,255 | 5/1992 | Nagata et al. | 358/136 |
| 5,122,873 | 6/1992 | Golin | 358/133 |
| 5,122,875 | 6/1992 | Raychaudhuri et al. | 358/133 |
| 5,124,790 | 6/1992 | Nakayama | 358/133 |
| 5,126,842 | 6/1992 | Andrews et al. | 358/133 |
| 5,129,059 | 7/1992 | Hannah | 395/166 |
| 5,130,568 | 7/1992 | Miller et al. | 307/272.2 |
| 5,134,487 | 7/1992 | Taguchi et al. | 358/209 |
| 5,134,697 | 7/1992 | Scheffler | 395/425 |
| 5,136,371 | 8/1992 | Savatier et al. | 358/133 |
| 5,142,380 | 8/1992 | Sakagami et al. | 358/432 |
| 5,146,325 | 9/1992 | Ng | 358/133 |
| 5,146,326 | 9/1992 | Hasegawa | 358/135 |
| 5,148,271 | 9/1992 | Kato et al. | 358/133 |
| 5,148,524 | 9/1992 | Harlin et al. | 395/166 |
| 5,151,875 | 9/1992 | Sato | 364/784 |
| 5,159,449 | 10/1992 | Allmendinger | 358/136 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,175,617 | 12/1992 | Wallace et al. | 358/133 |
| 5,179,372 | 1/1993 | West et al. | 340/799 |
| 5,182,642 | 1/1993 | Gersdorff et al. | 358/133 |
| 5,184,124 | 2/1993 | Molpus et al. | 341/50 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,201,056 | 4/1993 | Daniel et al. | 395/800 |
| 5,202,847 | 4/1993 | Bolton et al. | 364/725 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,216,724 | 6/1993 | Suzuki et al. | 382/7 |
| 5,223,926 | 6/1993 | Stone et al. | 358/133 |
| 5,227,878 | 7/1993 | Puri et al. | 358/136 |
| 5,228,098 | 7/1993 | Crinon et al. | 382/56 |
| 5,229,863 | 7/1993 | Kao et al. | 358/426 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,233,690 | 8/1993 | Sherlock et al. | 395/165 |
| 5,237,413 | 8/1993 | Israelsen et al. | 358/160 |
| 5,241,222 | 8/1993 | Small et al. | 307/449 |
| 5,241,383 | 8/1993 | Chen et al. | 358/136 |
| 5,241,658 | 8/1993 | Masterson et al. | 395/162 |
| 5,247,612 | 9/1993 | Quinard | 395/166 |
| 5,249,146 | 9/1993 | Uramoto et al. | 364/725 |
| 5,253,058 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,257,350 | 10/1993 | Howard et al. | 395/162 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,261,047 | 11/1993 | Rivshin | 395/163 |
| 5,263,136 | 11/1993 | DeAguiar et al. | 395/164 |
| 5,267,334 | 11/1993 | Normille et al. | 382/56 |
| 5,276,513 | 1/1994 | van der Wal et al. | 358/136 |
| 5,276,681 | 1/1994 | Tobagi et al. | 370/85.4 |
| 5,276,784 | 1/1994 | Ohki | 395/127 |
| 5,278,520 | 1/1994 | Parker et al. | 331/1 A |
| 5,278,646 | 1/1994 | Civanlar et al. | 358/133 |
| 5,278,647 | 1/1994 | Hingorani et al. | 358/136 |
| 5,283,646 | 2/1994 | Bruder | 348/415 |
| 5,287,178 | 2/1994 | Acampora et al. | 348/384 |
| 5,287,193 | 2/1994 | Lin | 358/261.1 |
| 5,287,420 | 2/1994 | Barrett | 382/56 |
| 5,289,276 | 2/1994 | Siracusa et al. | 348/467 |
| 5,289,577 | 2/1994 | Gonzales et al. | 395/163 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,242 | 4/1994 | Gonzales et al. | 382/56 |
| 5,301,272 | 4/1994 | Atkins | 395/165 |
| 5,303,342 | 4/1994 | Edge | 395/164 |
| 5,304,953 | 4/1994 | Heim et al. | 331/1 A |
| 5,305,438 | 4/1994 | MacKay et al. | 395/164 |
| 5,309,527 | 5/1994 | Ohki | 382/56 |
| 5,311,309 | 5/1994 | Ersoz et al. | 348/409 |
| 5,351,047 | 9/1994 | Behlen | 341/67 |
| 5,379,356 | 1/1995 | Purcell et al. | 382/56 |
| 5,436,665 | 7/1995 | Ueno et al. | 348/412 |

OTHER PUBLICATIONS

A Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 553–557.

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

PREDICTION FILTER

REFERENCE TO RELATED APPLICATIONS

This application is related to British Patent Application Serial No. 9405914.4 entitled "Video Decompression" filed Mar. 24, 1994.

BACKGROUND OF THE INVENTION

1. Field of the Invention

The present invention is directed to a decompression circuit. The decompression circuit operates to decompress and/or decode a plurality of differently encoded input signals. The embodiment chosen for description hereinafter relates to the decoding of a plurality of encoded picture standards. More specifically, this embodiment relates to the decoding of any one of the well-known compression standards as Joint Photographic Expert Group (JPEG), Motion Picture Experts Group (MPEG), and H.261.

According to the invention, a plurality of prediction filter circuits may process video information, and a control signal allows processing of video information encoded in multiple standards. A filter circuit as may be used to process video information is disclosed comprising a prediction filter formatter, a dimension buffer, and two one-dimensional prediction filters. Each such one-dimensional prediction filter may comprise six registers, two multiplexers, and two summing circuits, connected together such that processing of video information encoded in multiple standards may be processed.

2. Description of the Background Art

U.S. Pat. No. 4,866,510 to Goodfellow et al discloses a differential pulse code arrangement which reduces the bit rate of a composite color video signal. The reduction is achieved by predicting the present video signal sample from reconstructed past samples and forming a signal representative of the prediction error. The bit rate is further reduced by generating a signal predictive of the error signal and forming a signal corresponding to the difference between the error signal and the signal predictive thereof. On output, a video signal sample is reconstructed by summing the reconstructed error signal and the signal predictive of the previous video signal sample. A video signal sample generally comprises one or more lines of the composite signal.

U.S. Pat. No. 5,301,040 to Hoshi et al discloses an apparatus for encoding data by transforming image data to a frequency zone. The apparatus may comprise two encoding means, which may perform encoding in parallel.

U.S. Pat. No. 5,301,242 to Gonzales et al discloses an apparatus and method for encoding a video picture. The apparatus and method convert groups of blocks of digital video signals into compressible groups of blocks of digital video signals, according to the MPEG standard only.

U.S. Pat. No. 4,142,205 to Iinuma discloses an interframe encoder for a composite color television signal. The interframe encoder obtains a frame difference signal by subtracting one frame signal from the subsequent frame signal. A corresponding interframe decoder operates in reverse.

U.S. Pat. No. 4,924,298 to Kitamura discloses a method and apparatus for predictive coding of a digital signal obtained from an analog color video signal. During the predictive coding process, a picture element in a first scanning line is predicted on the basis of a picture element in a second scanning line adjacent to the first scanning line.

U.S. Pat. No. 4,924,308 to Feuchtwanger discloses a bandwidth reduction system for television signals. The system employs three spatial filter circuits capable of imposing respective resolution characteristics on the signals. Based on the degrees of motion occurring in respective spatial portions of the television picture, different levels of resolution are imposed by the different spatial filter circuits.

U.S. Pat. No. 5,086,489 to Shimura discloses a method for compressing image signals. According to the patent, original image signals components representing an image are sampled such that the phases of the samples along a line are phase shifted from the samples located along a neighboring line. These representative image signal components are classified into main components, sampled at appropriate sampling intervals, and interpolated components, subjected to interpolation prediction encoding processing based on the main components.

Examples and further explanation of the present invention will now be described with reference to the drawings.

SUMMARY OF THE INVENTION

Overview of the Decompression Circuit

Figure 1:
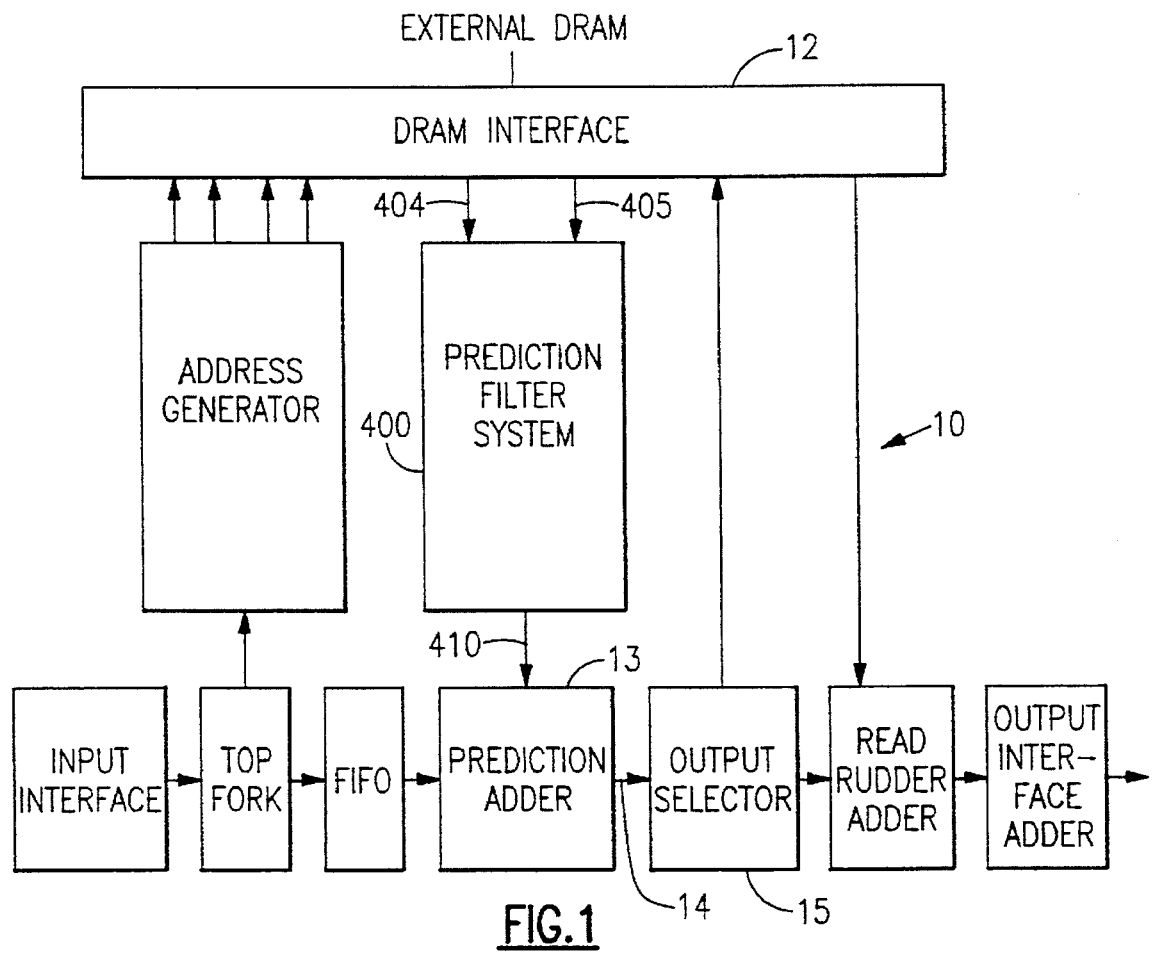
FIG. 1 is a block diagram of the temporal decoder including the prediction filter system.

The decompression circuit may comprise a Spatial Decoder, a Temporal Decoder, and a Video Formatter. Such a circuit is described in more detail in British Patent Application No. 9405914.4, which is hereby incorporated by reference.

Overview of the Temporal Decoder

The Temporal Decoder uses information in one or more pictorial frames, or reference frames, to predict the information in another pictorial frame. The operation of the Temporal Decoder differs depending on the encoding standard in operation, since different encoding standards allow different types of prediction, motion compensation, and frame re-ordering. The reference frames are stored in two external frame buffers.

Overview of the JPEG Standard

The JPEG standard does not use inter-frame prediction. Therefore, in this mode the Temporal Decoder will pass the JPEG data through to the Video Formatter, without performing any substantive decoding beyond that accomplished by the Spatial Decoder.

Overview of the MPEG Standard

The MPEG standard uses three different frame types: Intra (I), Predicted (P), and Bi-directionally interpolated (B). A frame is composed of picture elements, or pels. I frames require no decoding by the Temporal Decoder, but are used in decoding P and B frames. The I frames can be stored in a frame buffer until they are needed.

Decoding P frames requires forming predictions from a previously decoded I or P frame. Decoded P frames can also be stored in one of the frame buffers for later use in decoding P and B frames.

B frames are based on predictions from two reference frames, one from the future and one from the past, which are stored in the frame buffers. B frames, however, are not stored in either of the frame buffers.

The MPEG standard also uses motion compensation, which is the use of motion vectors to improve the efficiency of the prediction of pel values. Motion vectors provide offsets in the past and/or future reference frames.

The MPEG standard uses motion vectors in both the x-dimension and the y-dimension. The standard allows motion vectors to be specified to half-pel accuracy in either dimension.

In one configuration under the MPEG standard, frames are output by the Temporal Decoder in the same order that they are input to the Temporal Decoder. This configuration is termed MPEG operation without re-ordering. However, because the MPEG standard allows prediction from future reference frames, frames may be re-ordered. In this configuration, B frames are decoded and output in the same order as they are input, as described above. I and P frames, however, are not output as they are decoded. Instead, they are decoded and written into the frame buffers. They are output only when a subsequent I or P frame arrives for decoding.

For full details of prediction and the arithmetic operations involved, reference is made to the proposed MPEG standard draft. The Temporal Decoder meets the requirements listed therein.

Overview of the H.261 Standard

The H.261 standard makes predictions only from the frame just decoded. In operation, as each frame is decoded, it is written into one of the two frame buffers for use in decoding the next frame. Decoded pictures are output by the Temporal Decoder as they are written into the frame buffers; thus, H.261 does not support frame re-ordering.

In the H.261 standard, motion vectors are specified only to integer pel accuracy. In addition, the encoder may specify that a low-pass filter be applied to the result of any resulting prediction.

For full details of prediction and the arithmetic operations involved, reference is made to the H.261 standard. The Temporal Decoder meets the requirements listed therein.

The Temporal Decoder includes a prediction filter system. The prediction filter system receives a block or blocks of pixels to be used in the prediction, and additional information in the form of flags or signals. From the additional information, the prediction filter system determines the standard which is operational, the configuration of that standard, the level of accuracy of the motion vectors, and other information. The prediction filter system then applies the correct interpolation function based on that information.

Because some blocks of a frame may be predicted and other blocks may be encoded directly, the output from the prediction filters may need to be added to the rest of a frame. The prediction adder performs this function.

If the frame is a B frame, the Temporal Decoder outputs it to the Video Formatter. If the frame is an I or P frame, the Temporal Decoder writes the frame to one of the frame buffers and outputs either that frame, if frame re-ordering is inactive, or the previous I or P frame, if frame re-ordering is active.

DETAILED DESCRIPTION OF THE PREFERRED EMBODIMENTS

Figure 2:
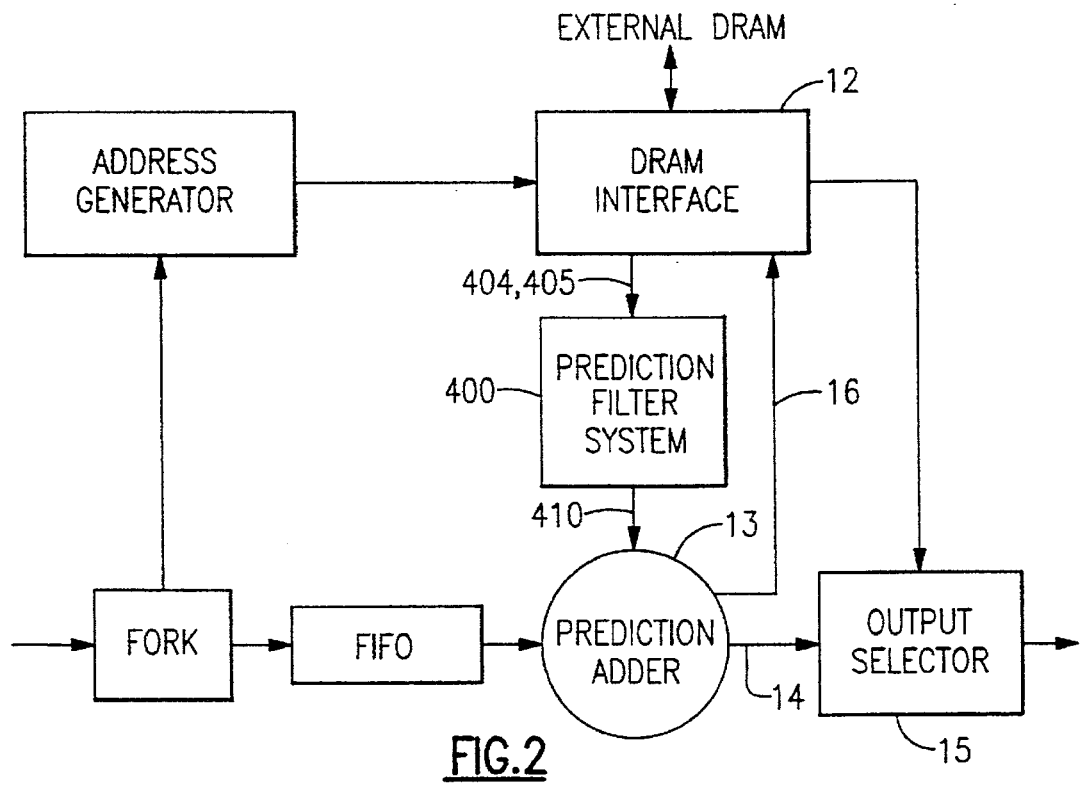
FIG. 2 is another block diagram of the temporal decoder including the prediction filter system.
Figure 3:
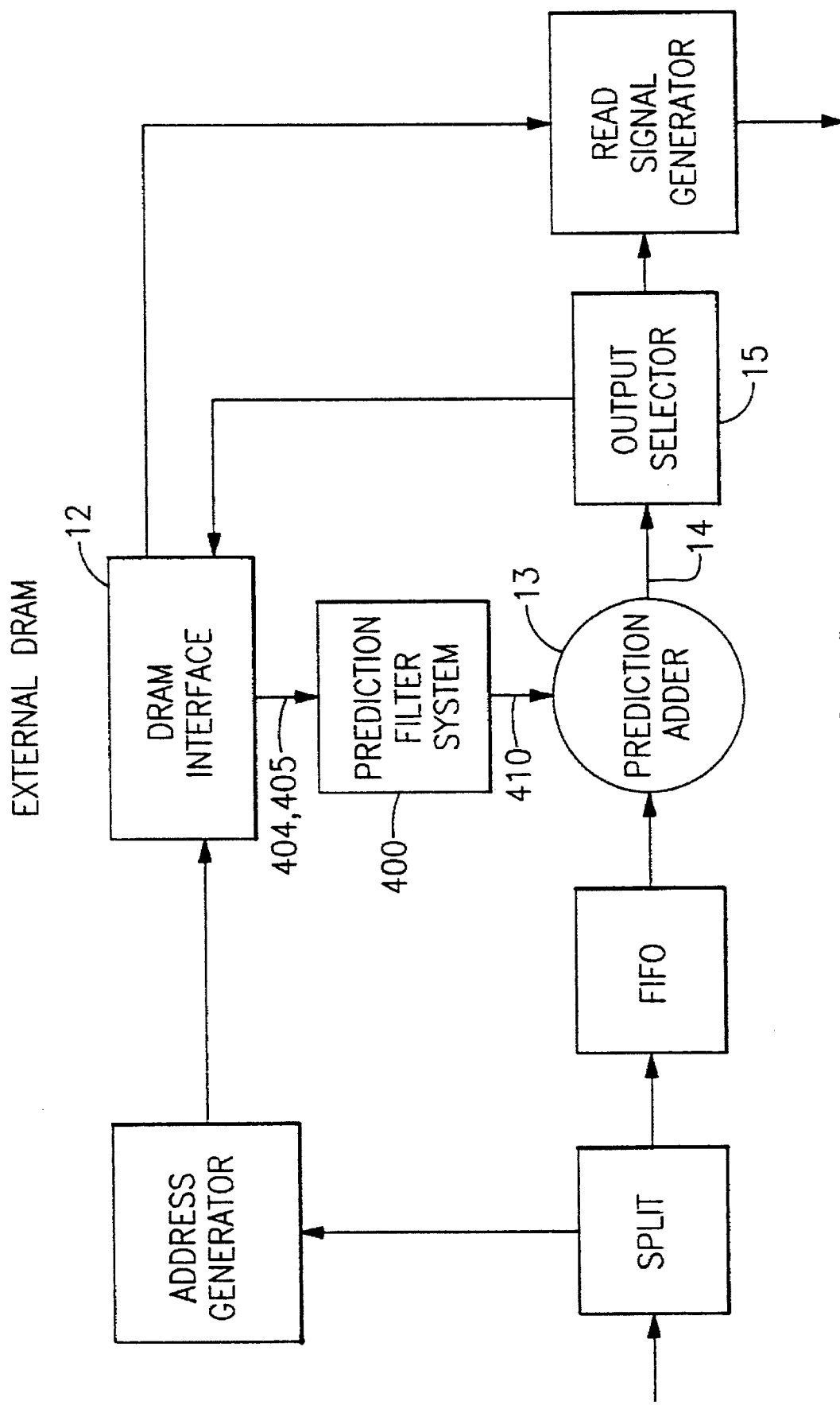
FIG. 3 is a block diagram of the temporal decoder including the prediction filter system.

A temporal decoder 10 is shown in FIGS. 1, 2, and 3. A first output from a DRAM interface 12 is passed over lines 404, 405 to a prediction filter system 400. The output from the prediction filter system 400 is passed over a line 410 as a second input to a prediction adder 13. A first output from the prediction adder 13 is passed over a line 14 to an output selector 15. A second output from the prediction adder 13 is passed over a line 16.

The prediction filter system 500 is a circuit for processing video information, comprising a first and a second prediction filter for parallel processing of video information, wherein the prediction filters are substantially identical, and a control signal to allow processing of video information encoded in multiple standards. More specifically, one embodiment of the prediction filter system 500 is a filter circuit for use in video decompression, comprising a prediction filter formatter, a first one-dimensional prediction filter operatively connected to the prediction filter formatter, a dimension buffer operatively connected to the first one-dimensional prediction filter, and a second one-dimensional prediction filter operatively connected to the dimension buffer. The prediction filter formatter comprises a plurality of multiple shift registers for outputting data in a predetermined order. Each of the prediction filters may comprise a first register, a second register, a first multiplexer operatively connected to the second register, a first summing circuit operatively connected to the first register and the first multiplexer, a third register operatively connected to the first summing circuit, a fourth register, a second multiplexer operatively connected to the fourth register, a fifth register operatively connected to the second multiplexer, a second summing circuit operatively connected to the third register and the fifth register, and a sixth register operatively connected to the second summing circuit.

Figure 4:
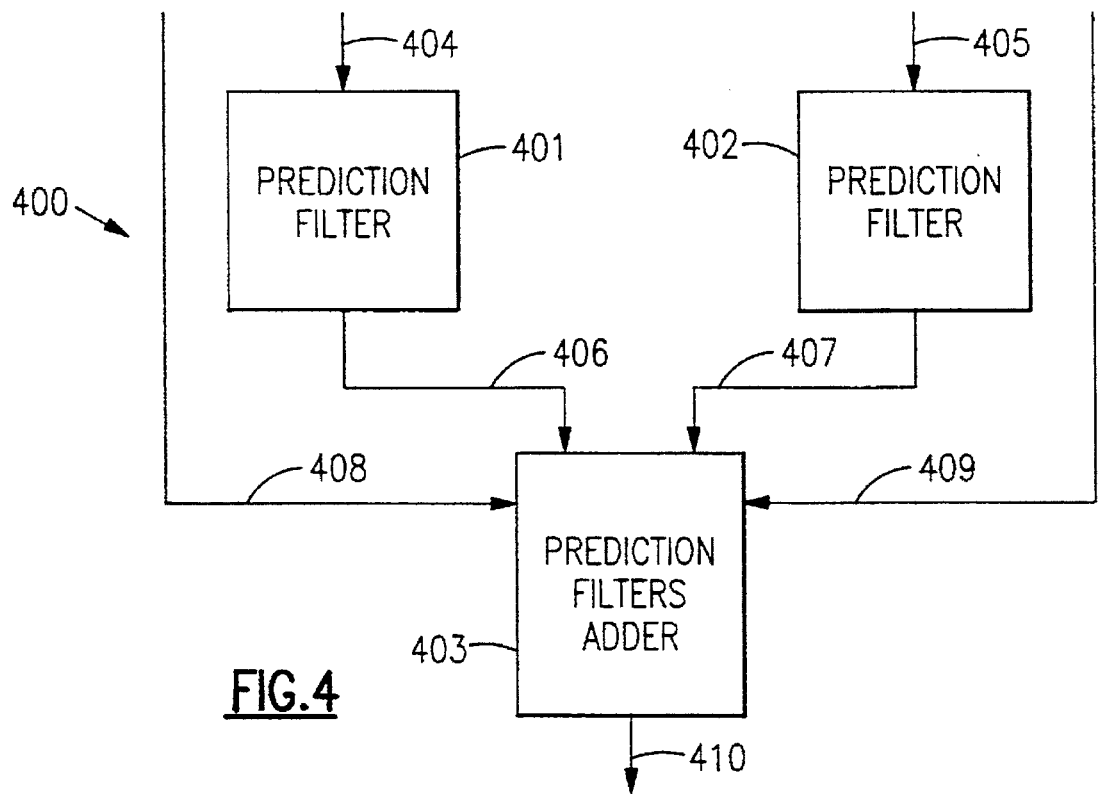
FIG. 4 is a block diagram of the prediction filter system according to an embodiment of the invention.

Referring to FIG. 4, the overall structure of the prediction filter system 400 is shown. The prediction filter system 400 comprises a plurality of prediction filters 401, 402 and a prediction filters adder 403. The forward prediction filter 401 and the backward prediction filter 402 are identical and filter the forward and backward prediction blocks in MPEG mode. In H.261 mode, only the forward prediction filter 401 is used, because the H.261 standard does not contain backward prediction capability.

Each prediction filter 401, 402 acts independently, processing data as soon as valid data appears at inputs 404, 405. The output from the forward prediction filter 401 is passed over a line 406 to the prediction filters adder 403. The output from the backward prediction filter 402 is passed over a line 407 to the prediction filters adder 403. Other inputs to the prediction filters adder 403 are passed over lines 408–409. The output from the prediction filters adder 403 is passed over a line 410. Each of the lines 404–410 in the prediction filter system 400 may be a two-wire interface.

Multi-standard operation requires that the prediction filter system 400 be configurable to perform either MPEG or H.261 filtering. Flags or other appropriate signals may be passed to the prediction filter system 400 to reconfigure the system. These flags are passed to the individual prediction filters 401, 402 as discussed in more detail later, and to the prediction filters adder 403.

There are four flags or signals which configure the prediction filters adder 403. Of these, fwd_ima_twin and fwd_p_num are passed through the forward prediction filter 401, and bwd-ima-twin and bwd-p-num are passed through the backward prediction filter 402.

As described in more detail later, the prediction filters adder 403 uses these flags or signals to activate or deactivate two state variables, fwd_on and bwd_on. The fwd_on state variable indicates whether forward prediction is used to predict the pel values in the current block. Likewise, the bwd_on state variable indicates whether backward prediction is used to predict the pel values in the current block.

In H.261 operation, backward prediction is never used, so the bw_on state variable is always inactive. Therefore, the prediction filters adder 403 will ignore the output from the backward prediction filter 402. If the fwd_on state variable is active, the output from the forward prediction filter 401 passes through the prediction filters adder 403. If then fwd_on state variable is inactive, then no prediction is performed for the current block, and the prediction filters adder 403 passes no information from either prediction filter 401, 402.

In MPEG operation, there are four possible cases for the fwd_on and bwd_on state variables. If neither state variable is active, the prediction filters adder 403 passes no information from either prediction filter 401, 402.

If the fwd_on state variable is active but the bwd_on state variable is inactive, the prediction filters adder 403 passes the output from the forward prediction filter 401.

If the bwd_on state variable is active but the fwd_on state variable is inactive, the prediction filters adder 403 passes the output from the backward prediction filter 402.

If both state variables are active, the prediction filters adder 403 passes the average of the outputs from the prediction filters 401, 402, rounded toward positive infinity.

Figure 5:
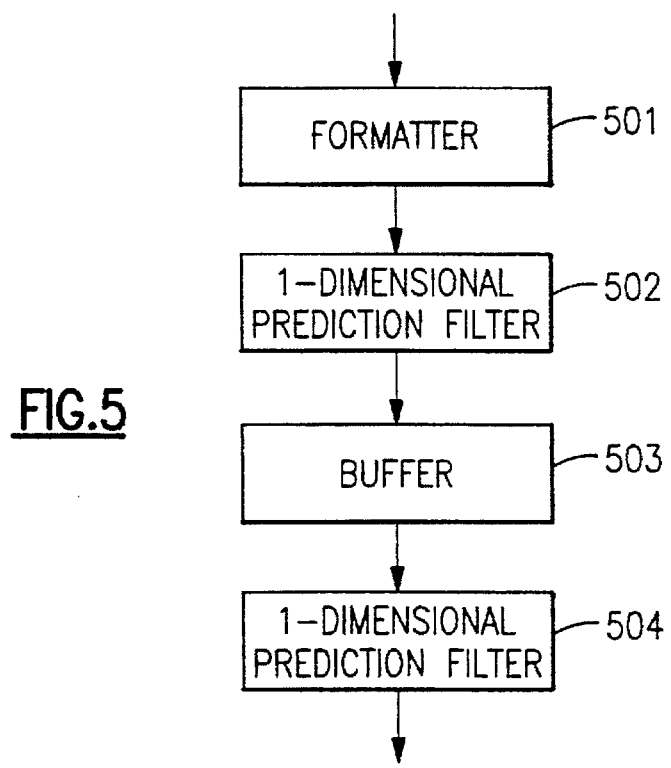
FIG. 5 is a block diagram of a prediction filter according to an embodiment of the invention.

As shown in FIG. 5, each prediction filter 401, 402 consists of substantially the same structure. Input data enters a prediction filters formatter 501, which puts the data in a form that can be readily filtered. The data is then passed to a first one-dimensional prediction filter 502, which performs a one-dimensional prediction. This prediction may be on the x-dimension or the y-dimension. The data is then passed to a dimension buffer 503, which prepares the data for further filtering.

The data is then passed to a second one-dimensional prediction filter 504, which performs a one-dimensional prediction on the dimension not predicted by the first one-dimensional prediction filter 502. Finally, the data is output.

For convenience of explanation only, the following discussion assumes that the one-dimensional prediction filter 502 operates on the x-coordinate and the one-dimensional prediction filter 504 operates on the y-coordinate. Either one-dimensional prediction filter 502, 504 may operate on either the x-coordinate or the y-coordinate. Thus, those skilled in the art will recognize from the following explanation how the one-dimensional prediction filters 502, 504 operate.

Figure 6:
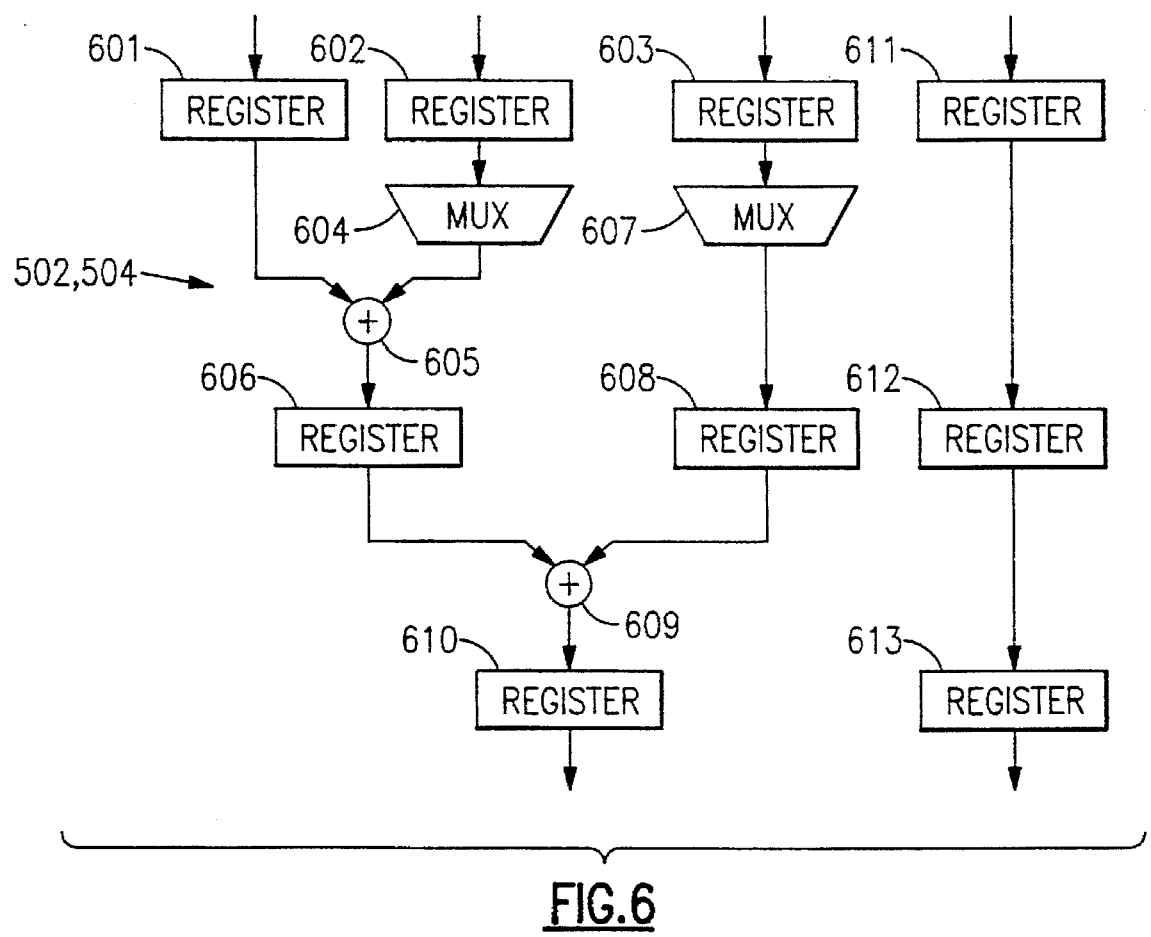
FIG. 6 is a detailed diagram of a prediction filter.

Referring to FIG. 6, there is shown the structure of a one-dimensional prediction filter 502, 504. The structure of each one-dimensional prediction filter 502, 504 is identical. Each contains three registers 601, 602, 603 which receive data. The data in the register 602 is passed to a multiplexer 604. The result from the multiplexer 604 is added to the data in the register 601 in a summing circuit 605, and the result is passed to a register 606.

The data in the register 603 is passed to a multiplexer 607, and the result is passed to a register 608. The data in the register 606 is added to the data in the register 608 in a summing circuit 609, and the result is passed to a register 610.

Additionally, three registers 611, 612, 613 pass control information through each one-dimensional prediction filter 502, 504. All data passed between both data components and control registers of the one-dimensional prediction filters 502, 504 may be passed over two-line interfaces. In addition, the input to the registers 601, 602, 603 and the output from the register 610 may be two-line interfaces.

Three information signals will be passed to the prediction filter system 400 to indicate which mode and which configuration is operational. The first signal is the h261_on signal. If this signal is active, then the H.261 standard is operational. If this signal is inactive, then the MPEG standard is operational.

The second and third signals, xdim and ydim, indicate whether the motion vector in a particular dimension specifies interpolation based on a half-pel or a whole pel. If the xdim signal is inactive, then the motion vector in the x-dimension specifies an integer multiple of a pel. If the xdim signal is active, then the motion vector in the x-dimension specifies an odd multiple of a half-pel. The ydim signal specifies the same information with regard to the y-dimension.

Figure 7:
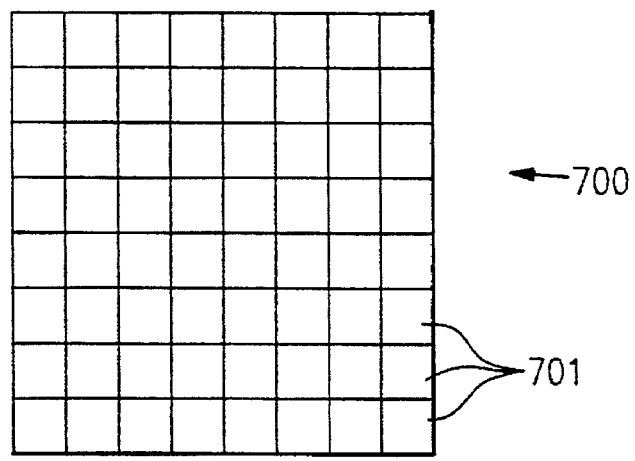
FIG. 7 is a block of pixel data.

Because the H.261 standard allows motion vectors only to integer pel accuracy, the xdim and ydim signals are always inactive when the h261_on signal is active. As shown in FIG. 7, the prediction filter system 400 outputs blocks 700 of eight rows of eight pels 701 each. In addition, as will be described with regard to the function of the one-dimensional prediction filters 502, 504 under each mode of operation, the size of an input block necessary to output a block of eight rows of eight pixels depends on whether xdim or ydim is active. In particular, if the xdim signal is active, the input block must have 9 pels in the x-dimension; if the xdim signal is inactive, the input block must have 8 pels in the x-dimension. If the ydim signal is active, the input block must have 9 pels in the y-dimension; if the ydim signal is inactive, the input block must have 8 pels in the y-dimension. This is summarized in the following table.

| h261_on | xdim | ydim | Function |
| --- | --- | --- | --- |
| 0 | 0 | 0 | Fi = xi |
| 0 | 0 | 1 | MPEG 8×9 block |
| 0 | 1 | 0 | MPEG 9×8 block |
| 0 | 1 | 1 | MPEG 9×9 block |
| 1 | 0 | 0 | H.261 Low-pass Filter |
| 1 | 0 | 1 | Illegal |
| 1 | 1 | 0 | Illegal |
| 1 | 1 | 1 | Illegal |

The operation of each one-dimensional prediction filter 502, 504 differs between MPEG and H.261 operation, and will be described in relation with each mode of operation. H.261 operation, being the more complex, will be described first.

In H.261 mode, each one-dimensional prediction filter 602, 604 implements the following standard one-dimensional filter equation:

$$F_i = \frac{x_{i+1} + 2x_i + x_{i-1}}{4} \quad (1 \leq i \leq 6) \tag{1}$$

-continued $$F_i = x_i \text{ (otherwise)}$$

Because xdim and ydim are always inactive in H.261 mode, the input block is eight rows of eight pels each. Therefore, FIG. 7 accurately represents both the input and the output blocks from the prediction filter system 400 in H.261 mode.

The equation (1) is applied to each row of the block 700 by the one-dimensional x-coordinate prediction filter 502, and is applied to each column of the block 700 by the one-dimensional y-coordinate prediction filter 504. Referring to FIG. 6, the pel values xi−1, xi and xi+1 in the equation (1) are loaded into registers 601, 602, 603, respectively.

The pel value xi is multiplied by two by the multiplexer 604, added to the pel value xi−1 in the summing circuit 605, and the result is loaded into the register 606. The pel value xi+1 in the register 603 passes through the multiplexer 607 without being altered, and is loaded into the register 608. Finally, the values in registers 606 and 608 are added together in the summing circuit 609, and loaded into the register 610.

The above process implements the H.261 equation for pels within a row or column. To implement the H.261 equation for the first and last pel in a row or column, the registers 601 and 603 are reset. The pel value xi flows through register 602 and is multiplied by four by the multiplexer 604. The result flows unaltered through registers 602 and 606, because the summing circuits 605 and 609 each add zero to the pel value xi.

It will be noted that the above implementations yield values equal to four times the result required by the one-dimensional filter equation. In order to retain arithmetic accuracy, division by 16, accomplished by shifting right by 4 places, is performed at the input to the prediction filters adder 403 after both x-dimension and y-dimension filtering has been performed.

During MPEG operation, the one-dimensional prediction filters 502, 504 perform a simple half-pel interpolation:

$$F_i = \frac{x_i + x_{i+1}}{2} \quad (0 \leq i \leq 7, \text{half} pel) \quad (2)$$

$$F_i = x_i \ (0 \leq i \leq 7, \text{integer} pel)$$

The operation of the one-dimensional prediction filter 502 is the same in MPEG mode with integer pel motion compensation as described above in connection with H.261 operation on the first and last pels in a row or column. For MPEG mode with half-pel operation, the register 601 is permanently reset, pel value xi is loaded into the register 602, and pel value xi+1 is loaded into the register 603. Pel value xi in the register 602 is multiplied by two by the multiplexer 604, and pel value xi+1 in the register 603 is multiplied by two by the multiplexer 607. These values are then added in summing circuit 609 to obtain a value four times the required result. As described above in connection with H.261 operation, this is corrected for at the input to the prediction filters adder 403.

In H.261 operation, the prediction filters formatter 501 merely ensures that data is presented to the first one-dimensional prediction filter 502 in the correct order. This requires a three-stage shift register, the first stage being connected to the input of the register 603, the second stage to the input of the register 602, and the third to the input of the register 601.

In MPEG operation, the operation is simpler. For half-pel interpolation, the prediction filters formatter 501 requires only a two-stage shift register. The first stage is connected to the input of the register 603, and the second stage to the input of the register 602. For integer pel interpolation, the prediction filters formatter 501 need only pass the current pel value to the input of the register 602.

In the H.261 mode, between the one-dimensional x-coordinate prediction filter 502 and the one-dimensional y-coordinate prediction filter 504, the dimension buffer 503 buffers data so that groups of three vertical pels are presented to the one-dimensional y-coordinate prediction filter 504. Therefore, no transposition occurs with the prediction filter system 400. The dimension buffer 503 must be large enough to hold two rows of eight pels each. The sequence in which pels are output from the dimension buffer 503 is illustrated in the following table.

| Clock | Input Pixel | Output Pixels | Clock | Input Pixel | Output Pixel |
|-------|-------------|---------------|-------|-------------|--------------|
| 1     | 0           | 55a           | 17    | 16          | 7            |
| 2     | 1           | 56            | 18    | 17          | F(0,8,16)b   |
| 3     | 2           | 57            | 19    | 18          | F(1,9,17)    |
| 4     | 3           | 58            | 20    | 19          | F(2,10,18)   |
| 5     | 4           | 59            | 21    | 20          | F(3,11,19)   |
| 6     | 5           | 60            | 22    | 21          | F(4,12,20)   |
| 7     | 6           | 61            | 23    | 22          | F(5,13,21)   |
| 8     | 7           | 62            | 24    | 23          | F(6,14,22)   |
| 9     | 8           | 63            | 25    | 24          | F(7,15,23)   |
| 10    | 9           | 0             | 26    | 25          | F(8,16,24)   |
| 11    | 10          | 1             | 27    | 26          | F(9,17,25)   |
| 12    | 11          | 2             | 28    | 27          | F(10,18,26)  |
| 13    | 12          | 3             | 29    | 28          | F(11,19,27)  |
| 14    | 13          | 4             | 30    | 29          | F(12,20,28)  |
| 15    | 14          | 5             | 31    | 30          | F(13,21,29)  |
| 16    | 15          | 6             | 32    | 31          | F(14,22,30)  | a. Last row of pixels from previous block or invalid data if there was no previous block (or there was a long gap between blocks).
b. F(x) indicates the function in H.261 filter equation.

In MPEG operation, the one-dimensional y-coordinate prediction filter 504 requires only two pels at a time. Therefore, the dimension buffer 503 needs only to buffer one row of eight pels.

It is worth noting that after data has passed through the one-dimensional x-coordinate prediction filter 502 there will only ever be eight pels in a row, because the filtering operation converts nine-pel rows into eight-pel rows. "Lost" pels are replaced by gaps in the data stream. When performing half-pel interpolation, the one-dimensional x-coordinate prediction filter 502 inserts a gap at the end of each row of eight pels; the one-dimensional y-coordinate prediction filter 504 inserts eight gaps at the end of a block.

During MPEG operation, predictions may be formed from either an earlier frame, a later frame, or an average of the two. Predictions formed from an earlier frame are termed forward predictions, and those formed from a later frame are termed backward predictions. The prediction filters adder 403 determines whether forward predictions, backward predictions, or both are being used to predict values. The prediction filters adder 403 then either passes through the forward or backward predictions or the average of the two, rounded toward positive infinity.

The state variables fwd_on and bwd_on determine whether forward or backward prediction values are used, respectively. At any time, both, neither, or either of these state variables may be active. At start-up or if there is a gap when no valid data is present at the inputs of the prediction filters adder 403, the prediction filters adder 403 enters a state where neither state variable is active.

The prediction filters adder 403 activates or deactivates the state variables fwd_on and bwd_on based on four flags or signals. These flags or signals are fwd_ima_twin, fwd_p_num, bwd_ima_twin, and bwd_p_num, and are necessary because sequences of backward and forward prediction blocks can get out of sequence at the input to the prediction filters adder 403.

The prediction mode, represented by the state variables fwd_on and bwd_on, is determined as follows:

(1) If a forward prediction block is present and fwd_ima_twin is active, then the forward prediction block stalls until a backward prediction block arrives with bwd_ima_twin set. The fwd_on and bwd_on state variables are then activated, and the prediction filters adder 403 averages the forward prediction block and the backward prediction block.

(2) Likewise, if a backward prediction block is present and bwd_ima_twin is active, then the backward prediction block stalls until a forward prediction block arrives with fwd_ima_twin set. The fwd_on and bwd_on state variables are then activated, and the prediction filters adder 403 averages the forward prediction block and the backward prediction block.

(3) If a forward prediction block is present but fwd_ima_twin is inactive, then fwd_p_num is examined. fwd_p_num is a two-bit variable. If fwd_p_num is equal to the number from the previous plus one, then the fwd_on state variable is activated and the state variable is deactivated. The prediction filters adder 403 outputs the forward prediction block.

(4) If a backward prediction block is present but bwd_ima_twin is inactive, then bwd_p_num is examined. Like fwd_p_num, bwd_p_num is a two-bit variable. If bwd_p_num is equal to the number from the previous prediction plus one, then the bwd_on state variable is activated and the fwd_on state variable is deactivated. The prediction filters adder 403 outputs the backward prediction block.

The prediction mode can only change between blocks 700. This condition occurs at start-up and after the fwd_1st_byte and/or bwd_1st_byte signals are active. These signals indicate the last byte of the current prediction block. If the current block 700 uses forward prediction, then only fwd_1st_byte is examined; if it uses backward prediction, then only bwd_1st_byte is examined; if it uses bi-directional prediction, then both fwd_1st_byte and bwd_1st_byte are examined.

The ima-twin and p-num signals are not passed along the same lines in the forward and backward prediction filters 401, 402 as the prediction block data. The reasons for this include:

(1) The ima_twin and p_num signals are only examined when the fwd_1st_byte and/or bwd_1st_byte are/is active. This saves approximately 25 three-bit communications across a line in each of the prediction filters 401, 402.

(2) The ima_twin and p_num signals remain active throughout a block and therefore are active when fwd_1st_byte and/or bwd_1st_byte reach the prediction filters adder 403.

(3) The ima_twin and p-num signals are examined a clock cycle before the prediction block data.

The prediction adder 13 forms the predicted frame by adding the data from the prediction filter system 400 to the error data. To compensate for the delay from the input through the address generator, DRAM interface, and prediction filter system 400, the error data passes through a 256-word first-in, first-out buffer (FIFO) before reaching the prediction adder 13.

The prediction adder 13 also includes a mechanism to detect mismatches in the data arriving from the FIFO and the prediction filter system 400. In theory, the amount of data from the prediction filter system 400 should exactly correspond to the amount of data from the FIFO which involves prediction. In the event of a serious malfunction, the prediction adder 13 will attempt to recover.

Where the end of the data from the prediction filter system 400 is detected before the end of the data from the FIFO, the remainder of the data from the FIFO continues to the output of the prediction adder 13 unchanged. On the other hand, if the data from the prediction filter system 400 is longer than the data from the FIFO, the input to the prediction adder 13 from the FIFO is stalled until all the extra data from the prediction filter system 400 has been accepted and discarded.

While the invention has been particularly shown and described with reference to a preferred embodiment and alterations thereto, it would be understood by those skilled in the art that various changes in form and detail may be made therein without departing from the spirit and scope of the invention.

What is claimed is:

1. A circuit for processing video information, comprising:
   a first and a second prediction filter circuit for parallel processing of video information, wherein the information is encoded according to a selected one of a plurality of compression standards, and wherein said prediction filter circuits are substantially identical and internally configurable according to requirements of said selected compression standard; and
   a control signal having a state representative of said selected compression standard for configuring said first and second circuits to allow processing of video information encoded in accordance therewith.

2. A circuit as defined in claim 1, wherein:
   said first prediction filter circuit comprises a forward prediction filter; and
   said second prediction filter circuit comprises a backward prediction filter.

3. A filter circuit for use in video decompression, comprising:
   a prediction filter formatter comprising a plurality of multiple shift registers for outputting data in a predetermined order;
   a first one-dimensional prediction filter operatively connected to said prediction filter formatter by a line;
   a dimension buffer operatively connected to said first one-dimensional prediction filter by a line; and
   a second one-dimensional prediction filter operatively connected to said dimension buffer by a line.

4. A filter circuit as defined in claim 3, wherein each said operatively connecting line comprises a two-wire interface.

5. A filter circuit as defined in claim 4, wherein:
   said first one-dimensional prediction filter comprises a one-dimensional x-coordinate prediction filter; and said second one-dimensional prediction filter comprises a one-dimensional y-coordinate prediction filter.

6. A filter circuit as defined in claim 4, wherein said dimension buffer is of the type which can store not more than sixteen pel values.

7. A filter circuit as defined in claim 3, wherein:
   said first one-dimensional prediction filter comprises a one-dimensional x-coordinate prediction filter; and
   said second one-dimensional prediction filter comprises a one-dimensional y-coordinate prediction filter.

8. A filter circuit as defined in claim 3, wherein each said one-dimensional prediction filter further comprises:

a first register;

a second register;

a first multiplexer operatively connected to said second register by a line;

a first summing circuit operatively connected to said first register by a line and operatively connected to said first multiplexer by a line;

a third register operatively connected to said first summing circuit by a line;

a fourth register;

a second multiplexer operatively connected to said fourth register by a line;

a fifth register operatively connected to said second multiplexer by a line;

a second summing circuit operatively connected to said third register by a line and operatively connected to said fifth register by a line; and a sixth register operatively connected to said second summing circuit by a line.

9. A filter circuit as defined in claim 8, wherein each said operatively connecting line comprises a two-wire interface.

10. A filter circuit as defined in claim 3, wherein said dimension buffer is of the type which can store not more than sixteen pel values.

11. A prediction filter, comprising:

a first register;

a second register;

a first multiplexer operatively connected to said second register by a line;

a first summing circuit operatively connected to said first register by a line and operatively connected to said first multiplexer by a line;

a third register operatively connected to said first summing circuit by a line;

a fourth register;

a second multiplexer operatively connected to said fourth register by a line;

a fifth register operatively connected to said second multiplexer by a line;

a second multiplexer operatively connected to said fourth register by a line;

a fifth register operatively connected to said second multiplexer by a line;

a second summing circuit operatively connected to said third register by a line and operatively connected to said fifth register by a line; and a sixth register operatively connected to said second summing circuit by a line.

12. A prediction filter as defined in claim 11, wherein each said operatively connecting line comprises a two wire interface.

* * * * *